(No Model.) 4 Sheets—Sheet 1.
W. B. PHINNEY.
MACHINE FOR COATING CONFECTIONERY.
No. 557,426. Patented Mar. 31, 1896.
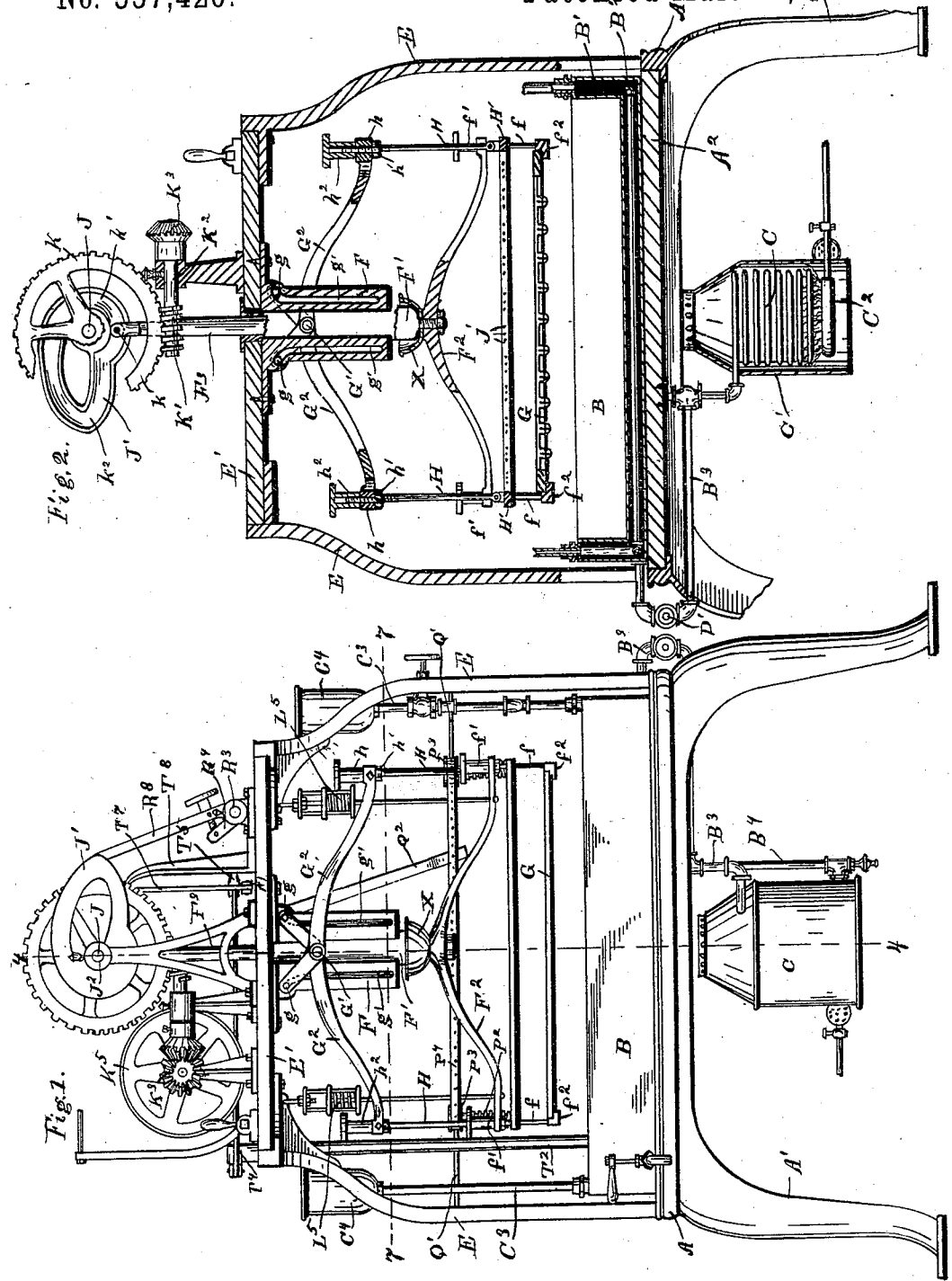
Witnesses
Bessie Griffith
Thomas Durant
Inventor
William B. Phinney
by Church & Church
his atty

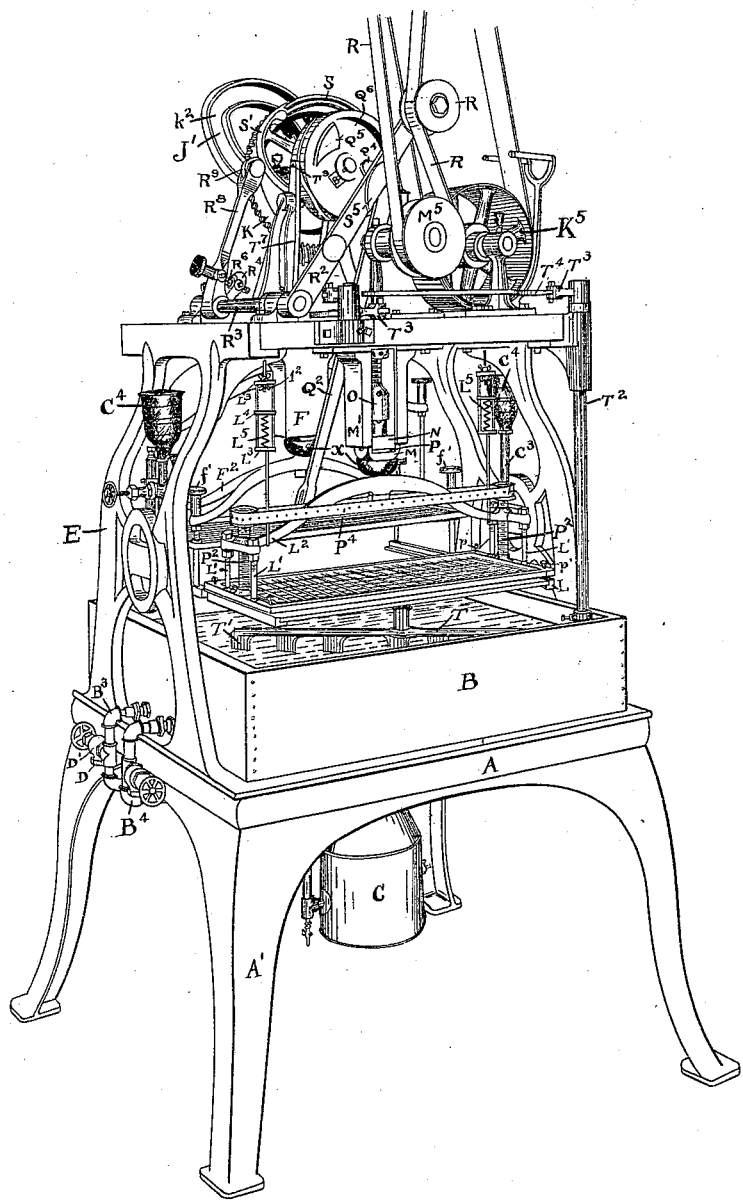

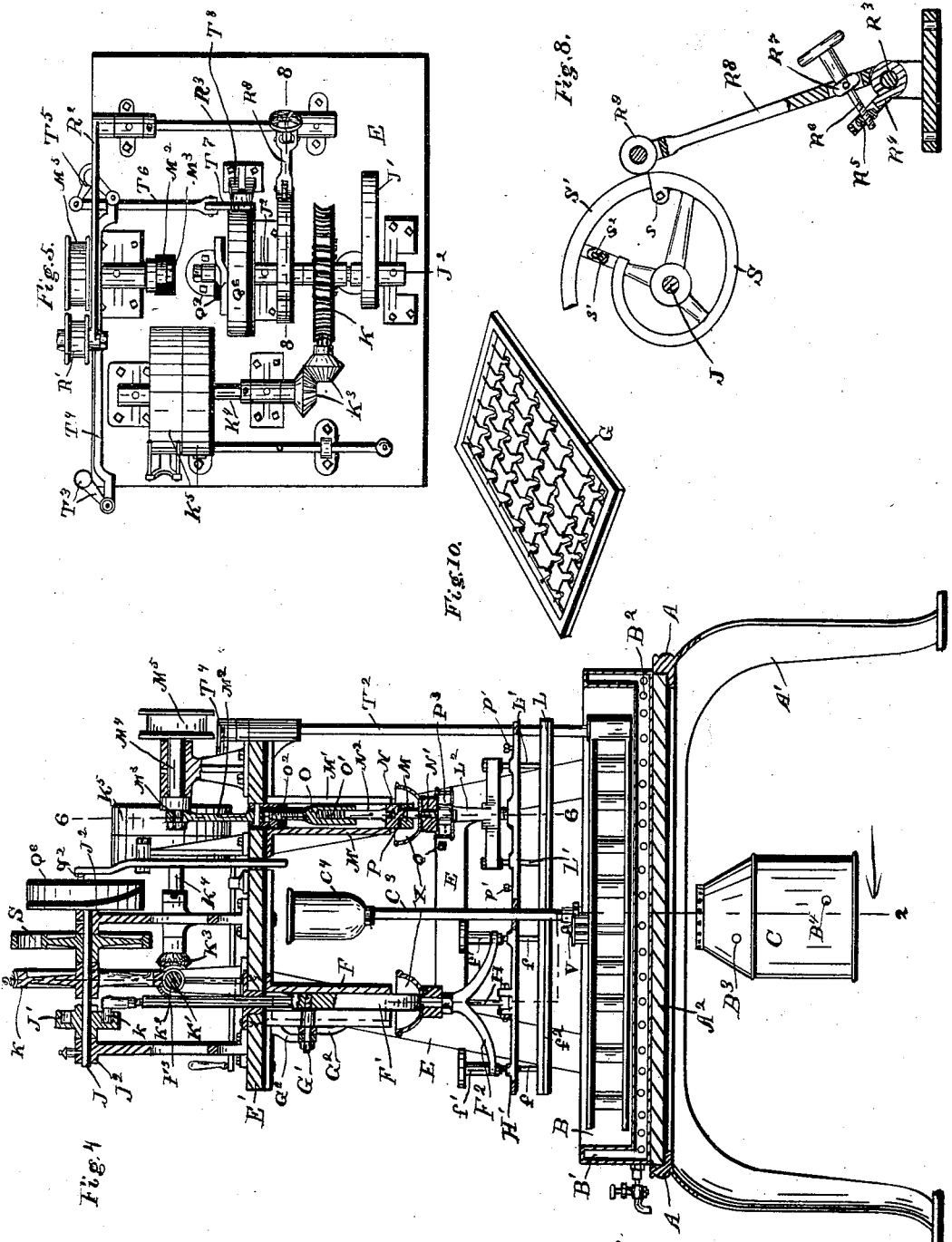

(No Model.) 4 Sheets—Sheet 4.
W. B. PHINNEY.
MACHINE FOR COATING CONFECTIONERY.
No. 557,426. Patented Mar. 31, 1896.
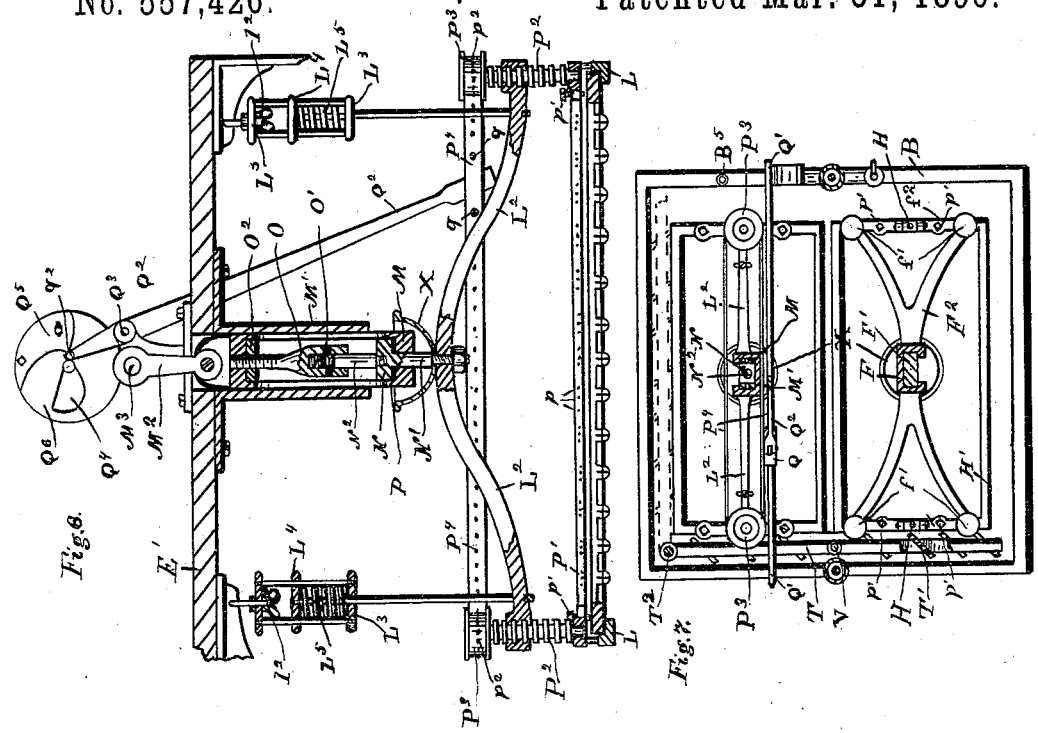
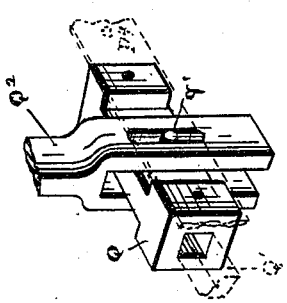
Witnesses:
Bessie Griffith
Thomas Durant
Inventor
William B. Phinney
by Church & Church
his attys

UNITED STATES PATENT OFFICE.

WILLIAM B. PHINNEY, OF ROCHESTER, NEW YORK, ASSIGNOR TO ORRIN T. STACY, OF SAME PLACE.

MACHINE FOR COATING CONFECTIONERY.

SPECIFICATION forming part of Letters Patent No. 557,426, dated March 31, 1896.

Application filed August 5, 1895. Serial No. 558,276. (No model.)

*To all whom it may concern:*

Be it known that I, WILLIAM B. PHINNEY, of Rochester, in the county of Monroe and State of New York, have invented certain new and useful Improvements in Machines for Coating Confectionery; and I do hereby declare the following to be a full, clear, and exact description of the same, reference being had to the accompanying drawings, forming a part of this specification, and to the reference-letters marked thereon.

In the manufacture of candies, bonbons, &c. which are provided with a coating, such as chocolate, it is desirable from a manufacturer's standpoint that the coating applied to the candies shall be of sufficient thickness to effectually cover or seal the candy center or filling and at the same time shall not be thicker than is necessary for this purpose, because as a rule the covering material, as chocolate, is much more expensive than the candy center or filling to be covered, and it is therefore desirable that just the right quantity for accomplishing the above purposes be applied and that the portion of the chocolate covering beyond what is necessary to accomplish the above results be saved; and the object of my present invention is to provide a machine that will accomplish these results, which is automatic in its operation and simple in construction; and to these ends the invention consists in certain improvements in construction and combinations of parts, all as will be hereinafter fully described, and the novel features pointed out in the claims at the end of this specification.

In the drawings, Figure 1 is a front elevation of a machine constructed in accordance with my invention; Fig. 2, a transverse sectional view taken on the line 2 2 of Fig. 4, looking in the direction of the arrow; Fig. 3, a perspective view of the machine looking from the rear corner; Fig. 4, a vertical sectional view on the line 4 4 of Fig. 1; Fig. 5, a top plan view; Fig. 6, a sectional view on the line 6 6 of Fig. 4; Fig. 7, a horizontal sectional view on the line 7 7 of Fig. 1; Fig. 8, a detail sectional view on the line 8 8 of Fig. 5; Fig. 9, a perspective view of a detail; Fig. 10, a perspective view of a tray.

Similar reference-letters in the several figures indicate similar parts.

A indicates the base-frame of the machine, provided with the supporting-legs A' and a wooden or other heat-non-conducting table or platform $A^2$ supporting a receptacle B, adapted to contain chocolate or other coating material. This receptacle B is provided with a chamber B' around it, adapted to contain water or other fluid, which is heated by means of a steam or hot-water coil $B^2$ arranged in said chamber, the ends of said coil being connected by pipes $B^3$ and $B^4$ with a heating-coil C arranged in a jacket C', preferably beneath the base of the machine and heated by means of a gas-burner $C^2$ or other suitable appliance, the steam generated or the water heated in the coil C circulating through the coil $B^2$ and heating the water, which will keep the contents of the receptacle B of the proper consistency.

Suitable couplings D are provided for connecting the steam-coil directly with the steam plant of a factory if it is desired to use the machine in such position that this can be conveniently done, and in this event the circulation through the coil C is cut off by means of valves D'; but I prefer to provide the separate steam-generating devices C to enable the machine to be used in any position desired. The vertical pipes $C^3$ $C^3$ have funnels $C^4$ at their upper ends for filling, and serve as expansion-chambers for the water in the jacket.

The operating parts of the machine are supported upon a frame extending over the chocolate-receptacle and having the side standards E E and at the top a platform or frame E'. Arranged on the under side of the platform E' and at one side of the center of the machine is a guide or way F, in which operates a reciprocating slide F' carrying a tray-dipper. Attached to the lower end of the slide is a spider or frame $F^2$, and through the arms of this spider pass bolts $f$ having hand-nuts $f'$ at their upper ends and carrying at their lower ends two horizontally-extending bars or plates $f^2$, constituting a support for a tray G, (shown in Figs. 1 and 2,) said tray being composed of a frame having cross-wires formed into pockets for containing the candy molds or forms to be coated, as shown in Fig. 10. Projecting from the front of the slide F' is a bolt G', upon which are pivoted two levers $G^2$ $G^2$, the short arms of the levers being provided with studs $g$ entering grooves $g'$, formed in the sides of the guide F, while the outer ends of said levers are provided with pivoted blocks $h$, through which pass rods $h$ pivoted at their lower ends to a candy-retainer H' extending over the tray-support $f^2$. This retainer H' is composed of an open, and preferably rectangular, frame adapted when the tray G is upon the support to hold it, if desired, and having cross-wires $j$ passing above the candies supported in the pockets of said tray and preventing them from floating out when the tray containing them is dipped beneath the chocolate or other coating contained in the receptacle B. The supporting-rods for the retainer H' are threaded at their upper ends, and upon such threaded portions, on opposite sides of the blocks $h$, are arranged adjusting-nuts $h'$ and $h^2$, as shown particularly in Fig. 2, for the purpose of adjusting the retainer for candies or trays of different thickness. The studs on the ends of the levers $G^2$ and the slots $g'$ in the guide F are so arranged that when the slide is moved downward the levers will be turned on their pivots and the frame H' will first be moved down in close proximity to the candies in the tray, and as the downward motion of the slide continues the tray and its contents will be dipped beneath the surface of the liquid coating and will then be raised up to the position shown in full lines in Fig. 1, the upward movement of the retainer H' being caused by the projections on the levers and the slots in the guides. If desired, the frame H' could serve as a clamp and directly engage the tray; but, as the trays are made of heavy material, this is not necessary, as the principal function is to prevent the candies from becoming displaced.

In the present construction this downward motion of the tray-dipper is accomplished by means of a cam J' mounted upon a shaft J supported in suitable bearings $J^2$ on the platform E'. With the groove in the cam coöperates a stud or roller $k$ on the end of an upwardly-extending arm $F^3$ attached to the slide F, and the cam is so shaped that, although the shaft J is revolving continuously, the dipping frame will be sustained in upper position, as shown, for a greater portion of the revolution of the shaft J, while the stud $k$ is in the concentric portion $k'$, the falling and rising of the tray-frame being accomplished by the portion $k^2$ of the cam-track, which is eccentric. The shaft J is driven by means of a worm-wheel K secured thereto, with which coöperates a worm K' on a shaft $K^2$, to which motion is communicated by beveled gears $K^3$ from a driving-shaft $K^4$ having suitable belt-pulleys $K^5$ thereon and supported in suitable bearings on the platform E'.

Arranged upon the opposite side of the machine, but above the coating-receptacle B, is a vibratory frame having a tray-support adapted to receive the trays containing the coated candies and to vibrate the same rapidly, so as to remove from the coated candies the surplus coating of chocolate, returning the latter to the receptacle. This frame embodies the two ways or lower bars L connected to a vibratory frame-actuator in the form of a slide M operating in a suitable guide M' projecting from the under side of the platform E', said slide being adapted to be reciprocated by means of a pitman $M^2$ pivoted to its upper end and to a wrist-pin $M^3$ on a shaft $M^4$ having a driving belt-pulley $M^5$, as shown in Figs. 4 and 6. The loose connection between the slide M and the yoke carrying the tray-frame is formed in the present instance by forming a central recess in the slide, in which is arranged a block N having a downwardly-projecting stud N', to which the yoke-frame is secured by a nut $n$, the upper end of said block having a stud $N^2$ entering a recess in the lower end of an adjusting-screw O, a spring O' being arranged between the end of the stud $N^2$ and the bottom of said recess, while the upper end of the bolt is threaded and has upon it a locking-nut $O^2$ abutting against the under side of the upper portion of the slide M.

P indicates a suitable packing, preferably of rawhide or similar material, arranged between the under side of the block N and the lower portion of the actuator or slide M, the connection of the parts being such that as the slide is reciprocated rapidly by the means described the tray-frame will be carried up with it and its upward momentum will be arrested by the spring O', and then, as it falls, it will be arrested by the packing P, diminishing the noise and causing a sudden jerk to the tray, which I find is essential to remove the surplus coating from the candies in the best manner. It will be understood that these reciprocating motions are very rapid, there being several hundred a minute. The tension of the spring O' can be readily changed by adjusting the bolt O in the slide and securing it in adjusted position by means of the set-nut $O^2$.

In order that the downward movement of the reciprocating tray-support may be cushioned and the intensity of the jar regulated as may be found best, I attach to the yoke $L^2$, on opposite sides of the center, spring-links each composed of two sections $L^3$ $L^4$, with a spring $L^5$ between them, the upper link-sections $L^4$ being adjustable relative to the upper frame by means of thumb-nuts $l^2$, as shown in Figs. 3 and 6.

It is of course necessary that the tray be clamped to the reciprocating support during the movement of the latter, and, while this may be accomplished in a variety of ways, I prefer to employ a frame P', sliding vertically upon bolts L' and having cross-wires $p$, constituting a candy-retainer, for preventing the candies coming out of the pockets in the tray, and small lugs $p'$, preferably in the form of screws, at the sides adapted to engage the upper sides of the tray when the clamp-frame is moved down.

The vertical movements of the clamp-frame are caused by two screws $P^2$ passing through suitably-threaded apertures in the ends of the yoke $L^2$ and connected at their lower ends to the side bars of the tray-clamp $P'$, so as to revolve therein, but when rotated in one direction operating to raise said clamp and release the tray and when rotated in the opposite direction to clamp said tray tightly to the support, and the upper ends of these screws are provided with pulleys $P^3$, having pins $p^2$ thereon, and are connected by a perforated belt $P^4$ extending around both said pulleys and causing their simultaneous operation in either direction to raise or lower the tray-clamping frame relative to the tray-supports L. This belt may be moved in opposite directions by hand to clamp or release the tray; but as I prefer to make the machine automatic I connect to this belt by suitable pins or rivets $q$ a slide Q, arranged upon a rod or way $Q'$ extending between the uprights or standards E E, said slide having a pin $q'$ operating in slots in the bifurcated end of a lever $Q^2$, pivoted at $Q^3$ to a bracket on the upper frame, and having at its upper end a small projection or roller $q^2$, arranged to be engaged by adjustable cam-sections $Q^4$ and $Q^5$, formed upon or secured to a cam-wheel $Q^6$ on the shaft J. The arrangement of the cam-sections is such that when the cam-wheel $Q^6$ is rotated section $Q^4$ will cause the lever to be moved in one direction to cause the belt to operate the screws and clamp the tray to the carrier, and the cam-sections $Q^5$ will operate the lever in the opposite direction, moving the screws in the opposite direction and raising the clamping-frame and releasing the tray, as will be described farther on.

The shaft $M^4$ is driven by a belt R passing around the pulley $M^5$ and another suitable driving-pulley, said belt being normally loose, but adapted to be tightened to operate the shaft $M^4$ by means of a belt-tightener embodying an idler-pulley $R'$, mounted upon the end of an arm $R^2$ attached to a rock-shaft $R^3$ on the top of the frame $E'$, and attached to the other end of said rock-shaft is an arm $R^4$, having a swiveled nut $R^5$ with which engages a screw $R^6$ passing through a block $R^7$ mounted on an arm $R^8$, the lower end of the last-mentioned arm being sleeved loosely on the rock-shaft, while the upper end is provided with a roller $R^9$, adapted to coöperate with the surface of a cam S, secured to the shaft J, said cam having a section $S'$ pivoted at $s$ and with its free end adjustable toward and from the shaft, so as to change the shape of the cam slightly, and secured in adjustable position by means of a bolt $s'$ operating through a slot $s^2$ on one arm of the cam-wheel S. Also mounted upon the arm $R^2$ is a brake-pad $S^5$, adapted to coöperate at certain times with the pulley $M^5$ to arrest the rotation of the latter when the belt is slackened. From this construction it will be seen that at certain times during the rotation of the shaft J the cam-wheel S will, through the parts described, operate the shaft $R^3$ and tighten the belt R on the pulley $M^5$, causing the vibratory tray-carrying frame to be operated in the manner described, the length of this operation depending on the size of the cam S, and that when the roller $R^9$ drops off the end of the cam and projects in close proximity to the shaft J the belt will be loosened and the brake-pad $S^5$ will engage the edge of the pulley $M^5$, arresting its motion, and the weight of the parts will hold the vibratory tray-frame in its lowermost position, as shown particularly in Fig. 4. The belt-tightener may be adjusted to give the required tension to the belt by means of the set-screw $R^6$ changing the position of the arm $R^8$ with relation to the arm $R^2$, attached rigidly to the shaft $R^3$.

Operating in the bottom of the tank or chocolate-receptacle B is a vibrating stirrer T having blades $T'$ at intervals in its length and secured to the lower end of a vertical rock-shaft $T^2$, journaled in suitable bearings in the upper frame and having upon its upper end an arm $T^3$ connected by a link $T^4$ with one arm of a bell-crank lever $T^5$, the other arm of which is connected by a link $T^6$ with the lower end of a lever $T^7$ (pivoted to a standard $T^8$ on the frame) and provided with a projection or roller entering a cam-groove $T^9$ in the periphery of the cam-wheel $Q^6$, which, as before stated, is attached to the shaft J. From this it will be seen that when the cam-wheel $Q^6$ is rotated the lever $T^7$ will be vibrated, and through the parts described the stirrer or agitator T will be moved from the position shown in full lines in Fig. 7 to that shown in dotted lines in said figure, agitating the chocolate or coating material and keeping it of the proper consistency.

Inasmuch as the the guides or ways F and $M'$ should be lubricated, I provide upon the under side of the slides $F'$ and M cups X adapted to receive any oil dripping from the ways and preventing its falling into the receptacle B.

The operation of the machine will now be apparent.

Assuming the receptacle B to be partially filled with chocolate or other material with which the candies are to be coated, and the two tray-carrying frames $H'$ and L in the position shown in Fig. 4, which is the normal position of the machine, and the tray-carriers being in alinement, the operator now slides a tray containing the uncoated candies upon the tray-supporting bars $f^2$, and the various cams and operating parts are so timed as to produce the following operations in the sequence noted: As the cam $J'$ revolves the slide $F'$ descends, the first portion of the movement causing the frame H' to move down over the tray and prevent the candies from floating out of the pockets therein. Then the eccentric portion $k^2$ causes said tray to be dipped beneath the surface of the chocolate, coating the candies, and the tray-support is then raised to normal position and held there by the concentric portion $k'$ of the cam J', and the last portion of the upward movement of the slide F' lifts the retainer H' to the position shown in full lines in Fig. 2. The operator stationed at the front of the machine now pushes the tray from the dipping carrier onto the vibratory tray-support L, as the two are then in line, as shown in Fig. 4, and the cam-section $J^4$ operates the lever $Q^2$, causing the downward movement of the tray-clamp P' to clamp the tray to the vibratory tray-support L, and as soon as this clamping operation has been completed the cam-wheel S operates the belt-tightener and causes the rapid rotation of the pulley $M^5$, and the vibration of the tray, through the means described, shaking the surplus chocolate from the coated drops back into the receptacle B. Meantime, and as soon as the dipping tray-support $F^2$ has arisen above the surface of the chocolate in the receptacle, the cam-groove $T^9$ operates the lever $T^7$, causing the stirrer T to move from its position at the side to the end of the receptacle (the position shown in dotted lines in Fig. 7) and then back to normal position. (Shown in full lines in said figure.) When the roller $R^9$ reaches the end of the cam S, the belt-tightener will be released and the brake applied to the pulley $M^5$, arresting the motion of the vibratory tray-carrier, and at this time the cam-section $Q^5$ actuates the lever $Q^2$ and releases the tray-clamp, permitting the operator to remove the tray from the vibratory carrier and transfer the candies, from which the surplus coating has been shaken, to the oiled paper or trays in the usual manner and send them to the cooling-room. After the stirrer T has returned to normal position, and preferably a short time before the vibration of the vibratory tray-support has ceased, the next downward movement of the dipping tray-support has been accomplished and another tray of candies has been dipped and the two carriers are again in line, so that the second tray may be pushed from the dipper to the vibratory carrier and the operations accomplished as before. It will thus be seen that the operation of the machine is continuous, and it is only necessary for one operator to supply trays of uncoated candies to the dipping carrier, then to move them to the vibratory carrier, from whence they are removed by a second operator after having had the surplus coating removed by shaking.

Of course, instead of timing the parts exactly, as described, the arrangement of the cams can be varied, as desired, it being sufficient that the dipping and vibratory carriers be arrested, so that the trays may be transferred from one to the other and the operation of the machine be continuous.

From a practical use of this machine I find that the candies may be coated evenly without waste of material, and the machine, being entirely automatic, only requires the application of trays of uncoated candies and the removal of the trays of coated ones.

In order that the temperature of the coating material may be accurately determined, I arrange in the stirrer T a pocket for receiving a removable thermometer V, which the attendant can remove and consult when the stirrer is at the position of rest at the side of the receptacle, as in full lines in Fig. 7.

It will be understood that other means for actuating the various removable parts could be employed, and I do not therefore desire to be confined to the details of construction shown herein.

I claim as my invention—

1. The combination with a receptacle for coating material, of a vertically-movable tray-dipper arranged over the receptacle, and an independent vertically-operating vibratory tray-support also arranged over the receptacle and in proximity to the dipping frame so that trays may be transferred from the dipper to the vibratory tray-support, substantially as described.

2. The combination with a receptacle for coating material, of a vertically-movable tray-dipper arranged over the receptacle and actuating mechanism therefor, a vibratory tray-support, and an operating mechanism therefor, and controlling devices, as cams, for controlling the actuating mechanisms and causing the arrest of the dipper and vibratory frame when in line with each other to permit the transfer of a tray from one to the other, substantially as described.

3. The combination with a receptacle for coating material, a vertically-movable tray-dipper arranged over the receptacle, and actuating mechanism therefor, and a movable candy-retainer on the dipper, of a vibratory tray-support arranged beside the dipper, a movable tray-clamp and candy-retainer on the latter, and actuating mechanism for vibrating the tray-support, substantially as described.

4. The combination with the receptacle for coating material, a vertically-movable tray-dipper arranged over the receptacle and actuating mechanism therefor, a vibratory tray-supporting frame beside the dipper and actuating mechanism therefor, of a stirrer and actuating mechanism therefor, and controlling devices, as cams, for controlling said actuating mechanisms and operating to cause the arrest of the dipper and tray-support when in juxtaposition, and to permit the movement of the stirrer when the dipper is out of the receptacle, substantially as described.

5. In a coating-machine, the combination with the receptacle, the movable dipper adapted to support a tray, of the retainer vertically movable toward and from the tray, levers pivoted upon and movable with the dipper and links connecting them with the retainer, and the stationary cams with which the levers coöperate to cause the retainer to move toward and from the tray as the dipper is operated, substantially as described.

6. The combination of the receptacle, the movable dipper, the crossed levers pivoted on the dipper, the vertically-movable candy-retainer, the links connecting it with the levers and the stationary cams having the straight and curved portions for moving the levers when the dipper is actuated, substantially as described.

7. In a coating-machine, the combination with a coating-receptacle and a vertically-operating vibratory slide, of a frame carried by the slide and having a tray-support thereon, the buffer arranged between the under side of the frame and the slide, and the spring between the slide and frame for holding the latter in engagement with the buffer, substantially as described.

8. In a coating-machine, the combination with a coating-receptacle, a vertically-operating vibratory slide, of a frame carried by the slide and having a tray-support thereon, the buffer arranged between the under side of the frame and the slide, and the spring arranged between the slide and frame, and means for adjusting its tension, substantially as described.

9. In a coating-machine, the combination with a coating-receptacle, and the vertically-operating vibratory slide having the recess therein, the block in the recess, and the tray-support attached to the block, the buffer between the under side of the block and the slide, the adjusting-screw and set-nut and the spring between the screw and block, substantially as described.

10. In a coating-machine, the combination with the main frame, the receptacle and the vibratory slide, the frame having a tray-carrier thereon loosely supported upon the slide, and the adjustable supporting-springs connected to the main frame and to the tray-carrier frame, substantially as described.

11. In a coating-machine, the combination with the vibratory frame having the tray-support, of the tray-clamp on the frame having the cross-wires, and positively-operating devices for moving the clamp up and down to cause it to engage and hold the tray during the vibration of the frame, substantially as described.

12. In a coating-machine, the combination with the vibratory frame having the tray-support, of the tray-clamp thereon, and the screws for raising and lowering the tray-clamp connected for simultaneous operation, substantially as described.

13. In a coating-machine, the combination with the main frame and the vibratory frame having the tray-support, and actuating devices for said vibratory frame, of the tray-clamp thereon, a cam, and positively-operating connections substantially as described between said cam and the tray-clamp for operating the latter positively at predetermined times in a direction to clamp and hold the tray and also at other times to release it, and connections between the frame-actuating devices and the cam, substantially as described.

14. In a coating-machine, the combination with the main frame, and the vibratory frame having the tray-support, of the tray-clamp on the vibratory frame, the screws for operating the clamp relative to the support, and connections between them, the lever for actuating the screws, and a cam for moving the lever at predetermined times to clamp and release a tray, substantially as described.

15. In a coating-machine, the combination with the main frame, and the vibratory frame having the tray-support, of the tray-clamp on the vibratory frame, the screws for operating the clamp, the belt connecting them, the slide connected to the belt, the lever and the cam, substantially as described.

16. The combination with the receptacle, the dipper, the vibratory frame having a tray-support, and actuating mechanism for vibrating the vibratory frame, of the cam for moving the dipper, the cam connected to the first-mentioned one, and devices, as a belt-tightener, and brake operated upon by the last-mentioned cam, for controlling the operation of the actuating mechanism of the vibratory frame, substantially as described.

17. The combination with the receptacle, the vibratory frame having the tray-support, and actuating mechanism for vibrating said frame, and a controlling device, such as a belt-tightener, of an adjustable cam operating said tightener, whereby the duration of the movement of the vibratory frame can be regulated as desired, substantially as described.

18. The combination with the main frame, and the receptacle, the vertically-movable dipper, and the cam for actuating it, the vibratory tray-support having a tray-clamp thereon, actuating mechanism for said tray-support, and controlling devices, as a cam and belt-tightener, connected to the first-mentioned cam for causing the relative movements of the dipper and vibratory frame, substantially as described.

WILLIAM B. PHINNEY.

Witnesses:
F. F. CHURCH,
GRACE A. RODA.